INVENTOR.
HEINZ E. ADELT
BY George E. Szekely

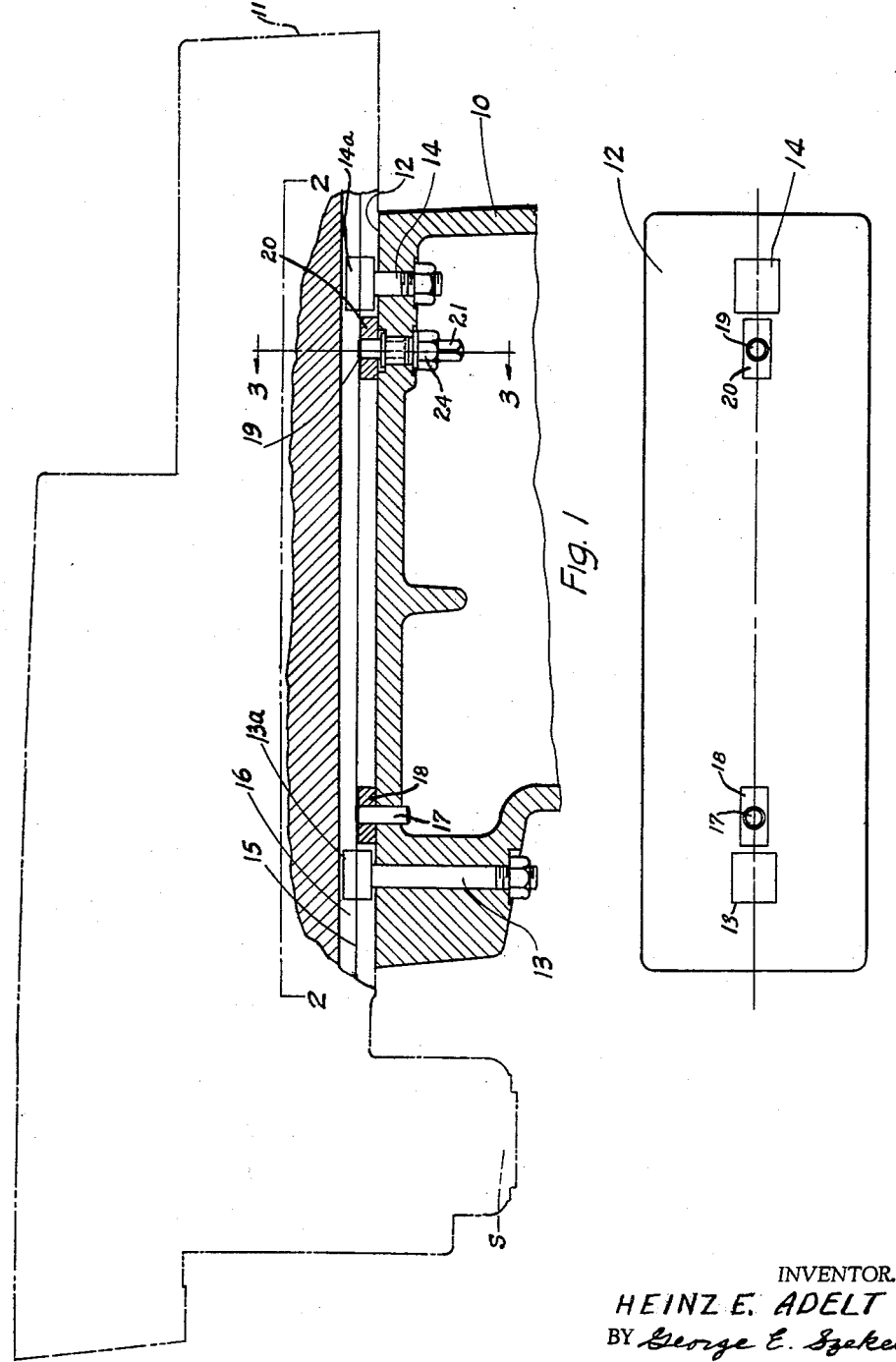

AGENT

United States Patent Office

3,169,449
Patented Feb. 16, 1965

3,169,449
RAM ALIGNMENT METHOD AND APPARATUS
Heinz E. Adelt, Racine, Wis., assignor to George Gorton Machine Co., Racine, Wis., a corporation of Wisconsin
Filed Sept. 23, 1963, Ser. No. 310,606
15 Claims. (Cl. 90—17)

My invention relates to the mounting and alignment of machine tool slide members. My novel assemblage is particularly adapted to the mounting and alignment of milling machine rams on column ways, but is not limited thereto.

Many machine tools involve the co-operative use of multiple, closely fitted sliding components, whose slide motions must be precisely oriented relative to each other. For example, the usual vertical milling machine may have four or more slide members, such as knee, saddle, table and ram. These members are generally arranged to traverse parallel or right rectilinear paths, or in any event along paths which are precisely oriented to each other. Unless the geometry is precisely established and held, the machine cannot operate with its intended precision.

I have found that establishing and maintaining the precise orientation of a milling machine ram is a particularly costly and difficult production and maintenance problem. The ram usually slides on a way at the top of the column. The problems of finish and assembly are compounded by the size, weight and irregular shapes of the parts or subassemblies. Dovetail ways present a complex and costly finishing problem, usually requiring gibs or the like for take-up of slack and wear. Various guide assemblages have been utilized, employing key and slot construction, or the like, but precision alignment in such cases usually involves much hand scraping, or other slow and costly finishing methods. A slight error may result in rework or even loss of an expensive unit. Even when satisfactorily completed, the usual construction provides no convenient, inexpensive means of adjusting for wear, strain or other subsequent source of error.

Previously known slide assemblies such as mill rams have depended on the accuracy of fit alone to establish the slide traverse axis, usually referred to another, remote axis. Thus, difficult layout, gauging and extra machining operations are encountered for truing the traverse, beyond those otherwise required for fitting the slide assembly itself. Minute errors in layout and gauging, or relatively slight wear and distortion may result in significant deviation of the ram slide from its intended rectilinear path. For example, an angular error of 1 minute in the alignment of an 18″-stroke ram results in a full stroke deviation of .005″+. Since the ram is often used to position tools for sequential operations within close tolerance limits, much time-and-cost-consuming gauging and positioning of tools and parts will be required for precision work, unless the ram alignment is held to the utmost accuracy.

While it is known to use various arrangements of gibs for the snugging and alignment of sliding members, such schemes are far too costly, complex and difficult to adjust and maintain in any adaptation involving a ram-column slide assembly or the like.

A principal object of my invention is to provide a simple, economical arrangement for accurately and adjustably fitting and holding a machine slide to its way.

A further object of my invention is to provide means for accurately aligning a machine slide on a prescribed path along a plane bearing, orienting to the traverse of one or more other slides of the machine.

A still further object of my invention is to provide a machine slide construction whose fit and alignment are readily adjustable to compensate for inaccuracies resulting from manufacturing variations, wear, strain or other causes.

Other objects and advantages will be apparent from the ensuing description and reference to the accompanying drawings in which:

FIG. 1 is a longitudinal section through the top of a vertical milling machine column, showing the arrangement for mounting a ram thereon in accordance with my invention, the column section being broken to omit extraneous detail, the ram being shown in partial section and outline;

FIG. 2 is a plan of the column top, the view being taken on line 2—2 of FIG. 1;

It will be understood that I have shown my mounting arrangement in adaptation for a milling machine by way of illustration. It will be apparent that the arrangement shown is readily adaptable to comparable slide member mounts of other machines or apparatus without departing from the spirit and scope of my invention.

Referring now to FIG. 1, numeral 10 indicates the top portion of the machine column and 11 indicates a ram arranged to bear slidably on plane top surface 12 of column top 10. I have shown in section only that portion of ram 11 which coacts with the mounting and alignment means. The remainder of ram 11 may be of any desired construction and configuration, but FIG. 1 shows a representative ram configuration in broken lines.

Figure 3:
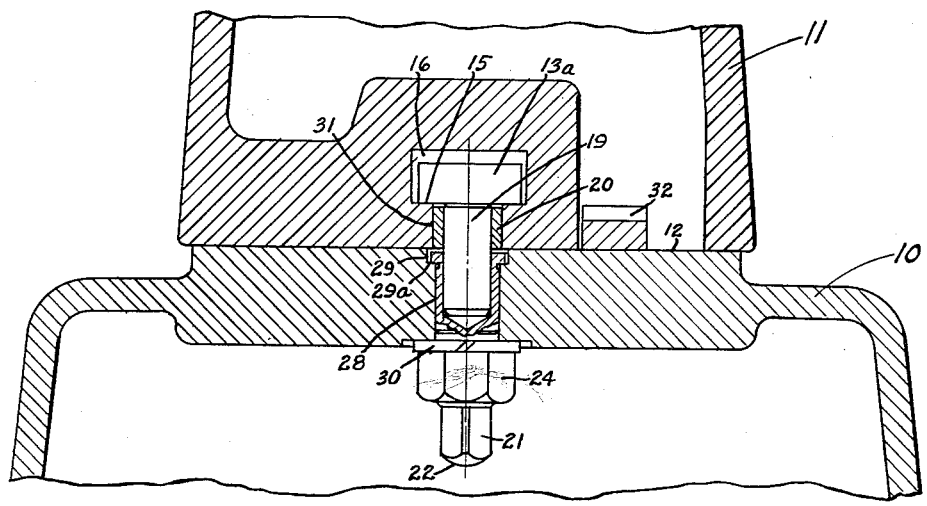
FIG. 3 is a transverse section on line 3—3 of FIG. 1, similarly broken, and showing in section that portion of the ram coacting with the mounting means.

The ram 11 is held against column surface 12 by T-head bolts 13 and 14 bearing on shoulder 15 defined by longitudinal T-slot 16, running lengthwise of ram 11. The form of slot 16 is best seen in FIG. 3, from which it will also be seen that head 13a of bolt 13 fits quite freely in slot 16. Bolt 14 has a similarly free-fitting head. Therefore, bolts 13 and 14 serve primarily to hold ram 11 on surface 12, providing only a rough alignment of the respective center-lines.

A dowel pin 17 projects from column 10, above surface 12, preferably in a position close to bolt 13, as shown. Rectangular precision guide key 18 is closely fitted to the projecting portion of pin 17. The fit is such that there is no play, but key 18 may pivot about pin 17 upon application of light or moderate torque, pin 17 being tight to column 10, to prevent drop-out. A similar pin 19 and key 20 are located on surface 12, preferably remote from key 18, close to bolt 14. However, parts 19 and 20 are fitted to column top 10 by means of an adjustment bolt 21, which is a primary feature of my invention and which is to be described in detail hereafter. The bolts 13, 14 and keys 18, 19 are shown in FIG. 2 as oriented along surface 12 to receive the ram 11 thereon.

Figure 4:
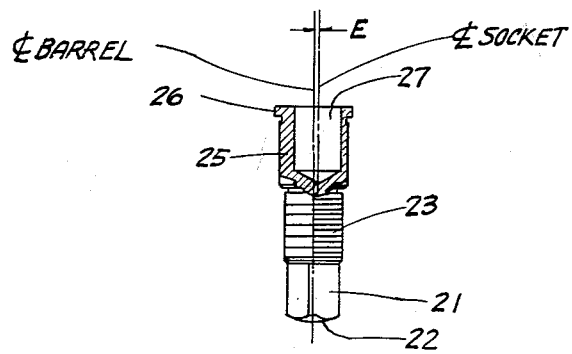
FIG. 4 is a detail showing construction of the ram alignment adjustment bolt.

Referring now to FIGS. 3 and 4, adjustment bolt 21 has a head 22, which may be of any convenient type. I find the square pattern shown particularly suitable, as it conforms to usual practices for machine adjusting screws and bolts. Adjacent to head 22 is a threaded portion 23, whose root diameter is preferably larger than the maximum diameter of head 22, so that a nut 24 may be passed over head 22. Beyond thread 23 is a barrel portion 25, terminating in a flange 26. Pin socket 27 is of such diameter and depth as to accommodate pin 19 with a drive fit to a home position which permits a portion of pin 19 to project beyond the outer face of flange 26.

As best seen in FIG. 4, the center of socket 27 is eccentric to the center of barrel 25 in an amount indicated by dimension E, the section being taken through the respective center lines, constituting the plane of eccentricity. As shown in FIG. 3, the section of barrel 25 is taken in the plane at right angles to the plane of FIG. 4. Thus, the co-ordinate of eccentricity is zero in the section plane of FIG. 3.

Barrel 25 is closely, but revolubly, fitted in hole 28, reamed through the column top 10. The outside diameter of barrel 25 being slightly larger than the major diameter of thread 23, the bolt 21 may be inserted from the top side of the column 10, with flange 26 resting on shoulder 29a, formed by shallow counterbore 29. The thickness of flange 26 is slightly less than the depth of counterbore 29, so that only pin 19 projects above surface 12. Lock washer 30 and nut 24 are assembled to bolt 21 from the end remote from pin 19, after bolt 21 has been inserted.

To prepare for reception of the ram 11, bolt 21 is preferably rotarily positioned as in FIG. 3, and temporarily locked by tightening nut 24, which draws flange 26 against shoulder 29a. The keys 18, 20 and bolts 13, 14 are then oriented as shown in FIG. 2, with their major axes on a common line. Ram 11 is rested on column surface 12, so that slot 16 is aligned with the bolt heads and keys. Ram 11 is then slid along surface 12, with shoulder 15 passing under the heads of bolts 13 and 14, while slot throat 31 closely engages the sides of keys 18 and 20, as best seen in FIG. 3. When the ram slot 16 is fully engaged with the bolt-heads and keys, ram 11 being in a position such as that shown in FIG. 1, bolts 13, 14 may be tightened just sufficiently to hold ram 11 firmly against surface 12, but permitting ram 11 to slide lengthwise of surface 12. The usual limit stops (not shown) may be provided to prevent ram travel beyond its intended limits. The ram may be propelled in any desired manner, such provisions being well known in the art. For example, the ram may be driven by a crank and pinion (not shown), in cooperation with rack 32 affixed to column 10.

After mounting as heretofore described, ram 11 is ready for precise alignment. Any machine reference surface and suitable means of linear travel gauging may be used, according to the nature and requirements of the specific machine involved. In the case of a vertical milling machine it will usually be most desirable and convenient to reference ram travel to table travel. Having established a surface on the table precisely at right angles to its traverse axis, for example a gauge block affixed in such position on the table, the ram spindle S, FIG. 1, may be equipped with an indicator having its point arranged to traverse the gauging surface. With the indicator zeroed at any selected ram position, the ram is then traversed, observing the direction and amount of runout on the indicator.

Assuming that an observer faces along the line of ram traverse, from the left of FIG. 1, with the ram moving "out" and traversing an indicator at the right of the gauge plane, an indicator stem extension during traverse indicates right runout, a stem retraction, left runout. Let it be assumed that in a particular case the trial shows right runout. It will then be necessary to swing the spindle left through an arc corresponding to the angle of departure determined by reading, conversion, or computation from the trial indication.

Correction for runout is made by loosening nut 24 and turning bolt 21. Because socket 27 is eccentric with respect to barrel 25, turning bolt 21 causes pin 19 to revolve about the axis of barrel 25 on the radius of eccentricity E. Key 20 is thus given a motion analogous to that of a cross-slide, cranked by pin 19. Since key 20 is closely fitted in ram slot throat 31, ram 11 is caused to swing about fixed pin 17 as a center, keys 18 and 20 revolving on their respective pins 19 and 21 into the alignment established by the rotative position of bolt 21. As previously described, and seen in FIG. 3, clearance is provided between bolt heads, 13a and 14a, and slot 16 to permit the swing of ram 11, the bolts also being able to turn, if necessary.

Figure 5:
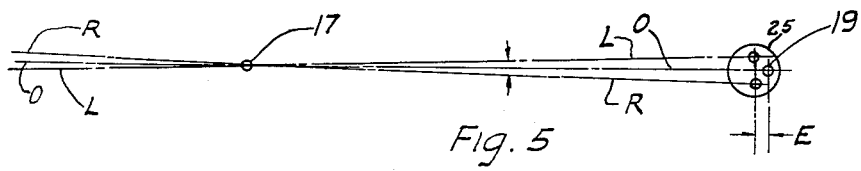
FIG. 5 is a diagram, illustrating the range of alignment adjustment secured with the mounting arrangement shown in FIGS. 1–4.

A typical adjustment range is diagrammatically illustrated in FIG. 5, in which view relative dimensions are exaggerated for the sake of convenience and clarity. In the example above described, it has been assumed that the ram 11 was originally traversed in line 0—0 which disclosed runout to the right of true square with the table traverse, as viewed from the left of FIG. 1. Then, viewing the diagram, FIG. 5, as taken on line 2—2 of FIG. 1, barrel 25 must be rotated clockwise, swinging the ram toward line R—R. When the indicator zeroes on the gauging plane, nut 24 (FIG. 3) is tightened, fixing ram 11 to its true traverse axis.

It will be apparent that the maximum angular adjustment range between lines L—L and R—R is a function of the center distance from pin 17 to barrel 25 and the value of eccentricity E. These controlling dimensions may be selected as best suits the requirements of a particular machine assembly. My invention is not limited to the particular range of adjustment shown and described, which is given by way of example only. In the case of the mill used for illustration, I find that a total swing of about 24 minutes of arc provides a satisfactory range of error compensation, accomplished with an 18-inch swing radius and $\frac{1}{16}$ inch pin eccentricity E. This relationship is readily accomplished with the parts positioned as shown in the drawings, my invention being thereby adapted to an otherwise substantially standard mill construction. It will be seen that the parts and machine work required to incorporate my adjustment apparatus are relatively simple, few and inexpensive. I find that the parts and machining costs are more than offset by the substantial saving in assembly and adjustment time, resulting in a net cost reduction for the completed machine, as well as insuring precision and freedom of slide traverse and the other advantages heretofore recited.

It will be apparent that the advantages of the described mounting arrangement are not restricted to the original manufacture. If at any time during the life of the machine it is found that the slide traverse is not true to reference, as may result from wear, stress, temperature effects, or other causes, the traverse may be adjusted on the job in the manner above described. This facility for field adjustment obviates reworking of machine components, long down times, laborious work gauging and positioning procedures, and other expensive operating and maintenance practices hitherto found necessary to continue such machines in operation at acceptable accuracy levels. Furthermore, my mounting and adjustment construction contributes materially to the longevity of precision machines, which might otherwise require premature replacement or relegation to less exacting work than that for which the machines were originally intended.

While I have described a preferred embodiment of my invention, for purposes of illustration, it will be understood that various changes may be made in form, construction and arrangement, without departing from the spirit and scope of invention defined in the appended claims.

Having thus described my invention, I claim the following:

1. A mounting structure for a machine slide, comprising in combination: a bearing for said slide; a linearly slidable, pivotal connection between said slide and said bearing; a rotatable member carried by one of said slide or said bearing; an eccentric carrier by said member in slidable and rotatable engagement with the other of said slide or said bearing; said member being spaced from said pivotal connection, whereby rotation of said member and eccentric causes relative angular displacement of said slide and said bearing about said pivotal connection; and means slidably holding said slide on said bearing in any selected angular relation established by rotation of said member and eccentric.

2. A mounting structure according to claim 1, wherein a fastening associated with said member is operable to fix said member in any selected rotary position thereof.

3. A mounting structure according to claim 1, wherein said member is a barrel with an eccentric socket and said eccentric is a pin in said socket, projecting therefrom.

4. A mounting structure according to claim 1, wherein said pivotal connection includes a pin dowelled in said bearing and projecting therefrom, and a guide key rotatably mounted on said pin in position to engage said slide.

5. A mounting structure according to claim 1, including a slot lengthwise of said slide; said pivotal connection being a first pin dowelled in said bearing, with a first key rotatably carried by said first pin, said key engaging a portion of said slot; said member being a barrel rotatably carried by said bearing and having a socket whose axis is eccentric to the axis of said barrel with a second pin dowelled in said socket, projecting therefrom; and a second key rotatably carried by said second pin, said second key engaging a portion of said slot remote from said first key in a direction lengthwise of said slide.

6. An adjustable alignment structure for a machine tool having a ram sliding on a column, comprising in combination: a slot lengthwise of said ram; a slide bearing surface on said column adjacent to said slot; a first pin projecting from said surface into said slot; a first guide key, rotatably carried by said first pin, engaging said slot; a rotatable alignment bolt carried by said column on an axis parallel to and remote from the axis of said first pin; a second pin projecting from said bolt into said slot, on an axis eccentric to the axis of said bolt; a second guide key, rotatably carried by said second pin, engaging said slot; whereby rotation of said bolt causes said ram to pivot about said first pin relative to said bearing surface.

7. A structure according to claim 6, including means for slidably retaining said ram against said bearing surface.

8. A structure according to claim 6, wherein said slot forms a T with its head remote from said bearing surface; said first and second keys engage the throat of said T; and said ram is held on said bearing surface by spaced T-head bolts engaging the head of said T with sufficient lateral play to accommodate pivoting of said ram relative to said bearing surface.

9. A structure according to claim 6, wherein said bolt includes means for locking said bolt in selected rotational position relative to said column.

10. A structure according to claim 6, wherein said column has a bore closely fitting said bolt and a counterbore recessed in said bearing surface; said bolt has at one end a flange resting in said counterbore with its outer face below said bearing surface; and said bolt has at its other end means for releasably clamping said bolt in selected rotational position by drawing said flange against a shoulder formed by said counterbore.

11. A structure according to claim 6, wherein said bolt has a socket with its axis eccentric to the axis of said bolt, said second pin being dowelled in said socket.

12. A milling machine structure, comprising: a ram having a T-slot lengthwise thereof; a hollow column having on its top a plane slide bearing surface to receive said ram; T-head bolts extending from said column into said T-slot to hold said ram to said bearing surface, the heads of said bolts engaging said slot with substantial lateral play; a first dowel pin projecting from said bearing surface into said T-slot a first guide key rotatably carried by said first dowel pin and engaging the throat of said T-slot; a barrel rotatably carried by said column adjacent said bearing surface, the axis of said barrel being parallel to the axis of said first dowel pin, said barrel having at its end toward said bearing surface a concentric flange and an eccentric socket; a second dowel pin in said socket, projecting therefrom into said T-slot; a second guide key rotatably carried by said second dowel pin and engaging the throat of said T-slot; threads on said barrel spaced from said flange; a wrench-head on said barrel at its end opposite from said flange, projecting from a wall of said column opposite said bearing surface; a nut on said threads bearable toward said wall; and a recess in said bearing surface coaxial with said barrel; whereby rotation of said barrel by means of said wrench-head causes said ram to pivot about said first dowel pin, and tightening said nut locks said barrel to said column in selected rotational position.

13. An alignment adjustment bolt for a machine slide assembly, comprising: a barrel terminating in a flange, a pin projecting from said barrel beyond said flange on an axis eccentric to the axis of said barrel, a threaded portion at the end of said barrel remote from said flange, and a head at the end of said bolt remote from said pin.

14. An alignment adjustment bolt for a machine slide assembly, comprising: a head, a threaded portion adjacent to said head, sized to receive a nut passable over said head, a precision finished barrel portion adjacent to said threaded portion, said barel portion terminating in a flange, a socket in said barrel portion having an axis eccentric to the axis of said barrel portion, and a pin in said socket projecting beyond said flange.

15. An alignment adjustment mechanism for a machine slide assembly, comprising: a wrench head, a thread adjacent to said head carrying a nut passable over said head, a precision finished barrel beyond said thread, said barrel terminating in a flange, a socket in said barrel having its axis eccentric to the axis of said barrel, a pin dowelled in said socket, said pin projecting beyond said flange, and a precision guide key closely, but rotatably, fitted to the projecting portion of said pin.

No references cited.

WILLIAM W. DYER, JR., *Primary Examiner.*